(No Model.)

A. C. QUADE, Jr.
ANIMAL WATERING DEVICE.

No. 432,078. Patented July 15, 1890.

Witnesses.

Inventor.
August C. Quade Jr.
By Erwin & Benedict
Attorneys.

UNITED STATES PATENT OFFICE.

AUGUST C. QUADE, JR., OF MAYFIELD, WISCONSIN.

ANIMAL-WATERING DEVICE.

SPECIFICATION forming part of Letters Patent No. 432,078, dated July 15, 1890.

Application filed February 16, 1889. Serial No. 300,121. (No model.)

*To all whom it may concern:*

Be it known that I, AUGUST C. QUADE, Jr., of Mayfield, in the county of Washington and State of Wisconsin, have invented new and useful Improvements in Animal-Watering Devices; and I do hereby declare the following to be a full, clear, and exact description of said invention, reference being had to the accompanying drawings, and to the letters of reference marked thereon, which form a part of this specification.

My invention relates to a device by which the weight of an animal is utilized to set the sails of a windmill to the wind, whereby a pump is operated to supply a trough with water, and also to close or open a valve whereby water is retained in the trough or is permitted to be discharged therefrom.

Figure 1:
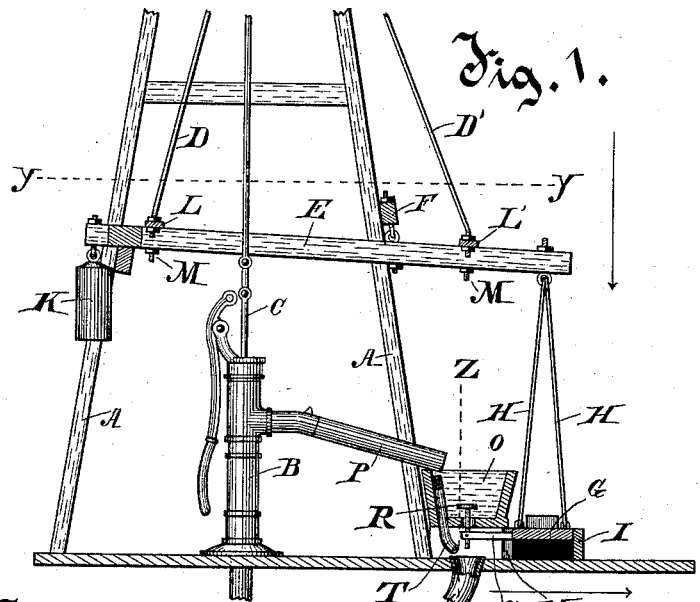
Figure 2:
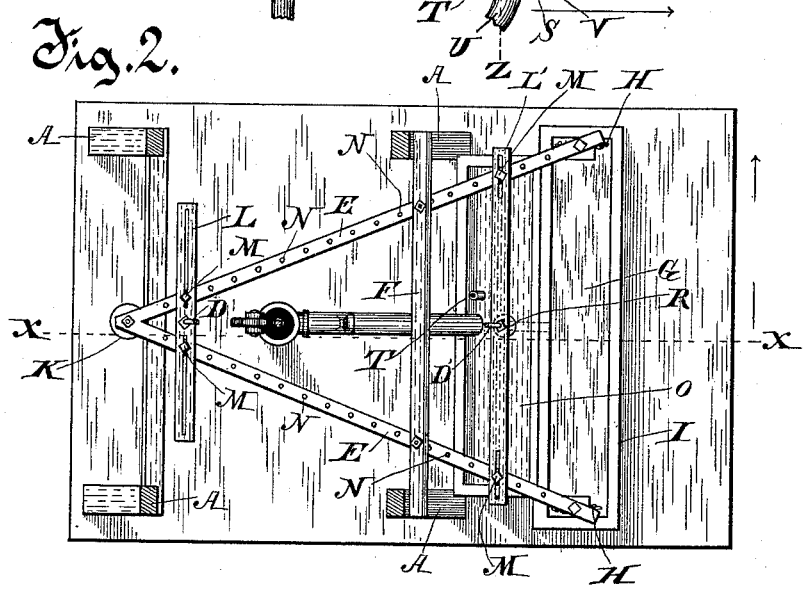
Figure 3:
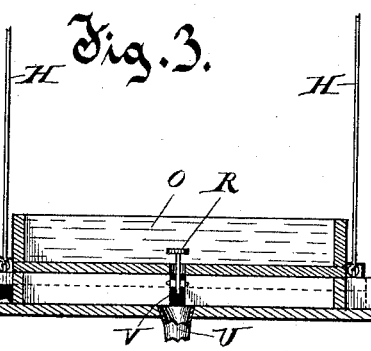

In the drawings, Figure 1 is a vertical section of my device on line X X of Fig. 2. Fig. 2 is a plan of my device on line Y Y of Fig. 1 looking downwardly. Fig. 3 is a vertical section of that part of my device seen on line Z Z of Fig. 1 looking in the direction of the arrow.

A A are the posts of a pyramidial frame erected about a pump B for supporting thereon a windmill for operating pump-rod C. The pump-rod C is connected to the crank of the windmill-axle, by which it is reciprocated by the operation of the windmill in the manner in common use.

In windmills as now constructed for use for reciprocating a pump-rod the sails of the mill are so constructed as to be capable of being turned into the wind or to be turned edgewise out of the wind, as desired, whereby the windmill is caused to rotate by the wind when the sails are set into the wind or remains at rest when the sails are turned edgewise out of the wind, and this setting the sails to the wind or turning them edgewise out of the wind is usually accomplished by means of one or more rods extending from the ground up to the axle or hub of the windmill, by the slight endwise movement of which, by the hand or other means, the setting the sails into or out of the wind is accomplished, either directly or indirectly, and such rods are shown in the drawings at D D', the movement of which, by the weight of an animal and a counterpoise, is one of the objects of my invention. A lever, consisting of two bars E E, preferably constructed in V shape, secured rigidly together at their point of junction, is hinged centrally to a beam F, rigid on posts A A of the frame. From the outer ends of the bars E E of the lever is suspended a platform G by the suspending-rods H H, which platform has a small amount of vertical movement and is inclosed at its sides and ends in a case I, which rests on the ground, the platform being located near the ground and having a vertical movement in the case I of a few inches only. The lever, with the platform G suspended therefrom at one end, is counterpoised at the other end by the weight K, whereby the platform G is held yieldingly away from the ground at the upper edge of the case I, as shown in Fig. 1. Cross-bars L L' are secured adjustably to the two bars E E of the lever, one on each side of its fulcrum by means of bolts M M, passing through slots therein and through apertures therefor in the bars E E. Corresponding apertures N N are provided in each of the two bars E E of the lever, whereby the cross-bars L L' may be adjusted near to or at a distance from the fulcrum of the lever, as desired, so that the movement of the rods D D', which are attached to the cross-bars L L', respectively, centrally, may be made greater or less, as desired, by increasing or diminishing the distance of the cross-bars from the fulcrum of the lever. These rods D D' are adapted by their endwise movement to tilt a lever or bar, and thereby to throw the sails of a windmill into or out of the wind. A convenient construction is to connect these rods at their upper extremities, respectively, one to each end of a straight horizontal centrally-pivoted lever, by the tilting of which lever the sails are manipulated. It is a more reliable construction to attach both rods D and D' to the lever above described; but the device would work successfully if but one rod was connected to the lever, and when a bell-crank lever is used instead of a straight lever only one of the rods is required; and in that case the connecting-rod D' is used, when the arm of the lever must be pulled down in order to set the sails into the wind, and the other is used when it is necessary to raise the rod for the purpose of setting the sails into the wind. A trough O is constructed alongside of the platform G in such relation thereto that an animal coming to the trough to drink will place its fore feet on the platform G in order to take water from the trough. The weight of the animal on the platform H will depress it, and thereby elevate the rod D and depress the rod D', connected with the lever, and thereby set the sails of the windmill, by the rotation of which mill the pump-rod C will be reciprocated and water will be drawn through the pump and discharged into the trough O through the spout P, extending from the pump to the trough. When the animal steps off the platform G, the counterpoise K will raise it again to the position shown in Fig. 1, and will at the same time pull down the rod D and raise the rod D', thereby turning the sails of the windmill out of the wind and stopping its motion. An aperture in the bottom of the trough is provided with a check-valve R, which is attached by its stem to an arm S, rigid to the platform G, whereby as the platform is carried down to the ground by the weight of the animal the aperture in the trough is closed by the valve R and will remain closed until the platform G rises, when the valve will be raised, permitting the water to escape from the trough, whereby the freezing of water in the trough is obviated. An overflow-pipe T is inserted in the trough, having its mouth near the upper edges of the walls of the trough, whereby when the trough has become nearly full of water any surplus will overflow into this pipe and will be discharged into the waste-pipe U. The case I retains the platform G in position against horizontal movement and protects the platform against being obstructed in its vertical movement by snow or other obstruction getting beneath it. A recess or slot V is provided in the rear wall of the case I for the vertical movement therein of the arm S.

What I claim as new, and desire to secure by Letters Patent, is—

1. As a device for locking and unlocking the sails of a windmill, a lever hinged to the supporting-frame, a movable platform suspended from one end of the lever, and a counterpoise on the other end of the lever, in combination with a connecting-rod connecting the lever with the mechanism of the windmill, substantially as and for the purpose set forth.

2. The combination of a counterpoised centrally-hinged lever connected with the sail-shifting mechanism of a windmill with a movable platform suspended from the lever, a trough alongside the platform, and a valve attached to and movable with the platform adapted to close temporarily an aperture in the bottom of the trough, substantially as described.

3. In a device for turning the sails of a windmill into the wind, a centrally-hinged lever E, constructed in two parts, united in V shape, and a movable platform suspended from one end of the lever, which platform has an unvarying extent of movement, in combination with a cross-bar provided with slots and secured adjustably to the lever by bolts passing through the slots and through apertures therein, which cross-bar is attached to a rod having endwise movement for locking or releasing the mechanism in the windmill, substantially as and for the purpose set forth.

In testimony whereof I affix my signature in presence of two witnesses.

AUGUST C. QUADE, Jr.

Witnesses:
ANDREW MARTIN,
WILHELM QUADE.